United States Patent
Furukawa

(10) Patent No.: US 10,948,435 B2
(45) Date of Patent: Mar. 16, 2021

(54) X-RAY FLUORESCENCE ANALYSIS DEVICE, AND SPECTRUM DISPLAY METHOD USED IN SAME

(71) Applicant: Shimadzu Corporation, Kyoto (JP)

(72) Inventor: Hiroaki Furukawa, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 621 days.

(21) Appl. No.: 15/741,390

(22) PCT Filed: Jul. 3, 2015

(86) PCT No.: PCT/JP2015/069264
§ 371 (c)(1),
(2) Date: Oct. 2, 2018

(87) PCT Pub. No.: WO2017/006383
PCT Pub. Date: Jan. 12, 2017

(65) Prior Publication Data
US 2019/0391091 A1 Dec. 26, 2019

(51) Int. Cl.
*G01N 23/00* (2006.01)
*G01N 23/223* (2006.01)

(52) U.S. Cl.
CPC .................. *G01N 23/223* (2013.01)

(58) Field of Classification Search
CPC .................. G01N 23/223; G01N 2223/076
See application file for complete search history.

(56) References Cited

FOREIGN PATENT DOCUMENTS

| CN | 2583668 Y | 10/2003 |
|---|---|---|
| CN | 101446563 A | 6/2009 |
| JP | H5-52775 A | 3/1993 |
| JP | H10-318836 A | 12/1998 |
| JP | H11-271246 A | 10/1999 |
| JP | 2001-349851 A | 12/2001 |
| JP | 2013-053872 A | 3/2013 |
| JP | 2013053872 A * | 3/2013 |

OTHER PUBLICATIONS

JP2013053872A English Translation (Year: 2020).*
(Continued)

*Primary Examiner* — Dani Fox
(74) *Attorney, Agent, or Firm* — Maier & Maier, PLLC

(57) ABSTRACT

In order to identify fluorescent X-rays and diffracted X-rays in a software without changing a configuration of an X-ray fluorescence analysis apparatus and to display fluorescent X-ray information and diffracted X-ray information on peaks in a spectrum, the X-ray fluorescence analysis apparatus having an X-ray tube that emits X-rays to a sample and a detector that detects X-rays from the sample and generating and displaying a spectrum indicating a relationship between X-ray energy and an element content based on the X-rays detected by the detector, includes: an identification information generation unit that generates identification information specifying a peak position by a diffracted X-ray caused by a crystal structure of the sample; and a display control unit that displays the diffracted X-ray information on a peak in the spectrum based on the identification information.

5 Claims, 5 Drawing Sheets

(56) References Cited

OTHER PUBLICATIONS

Office Action dated Apr. 17, 2020 in corresponding Chinese Application No. 201580082847.1; 17 pages including English-language translation.
International Search Report dated Sep. 29, 2015 of corresponding International application No. PCT/JP2015/069264; 3 pgs.
Chinese Office Action dated Dec. 3, 2019, in connection with corresponding CN Application No. 201580082847.1 (22 pgs., including machine-generated English translation).

* cited by examiner

X-RAY FLUORESCENCE ANALYSIS DEVICE, AND SPECTRUM DISPLAY METHOD USED IN SAME

FIELD

The present invention relates to an X-ray fluorescence analysis apparatus for acquiring information on elements contained in a sample and a spectrum display method used for the same.

BACKGROUND

An X-ray fluorescence analysis apparatus is an apparatus that performs qualitative and quantitative analysis of elements contained in a solid sample, a powder sample, or a liquid sample by irradiating the sample with a primary X-ray and detecting intensities of fluorescent X-rays emitted from the sample excited by the primary X-ray.

FIG. 4 is a schematic configuration diagram illustrating a configuration of a general energy dispersive X-ray fluorescence analysis apparatus in the related art. An energy dispersive X-ray fluorescence analysis apparatus 101 includes an analysis chamber 20 in which a sample S is arranged, an apparatus casing 50 in which an X-ray tube 10 and a detector 30 are arranged, a pulse processor 41, a data memory 42, and a computer 160 that controls the X-ray tube 10 and the detector 30.

The analysis chamber 20 includes a quadrangular plate-shaped sample base 21 and a quadrangular cylindrical upper chamber 22 having a quadrangular plate-shaped upper surface. A circular opening 21a is formed in the central portion of the sample base 21. The upper chamber 22 is rotatably attached to the sample base 21 so that the lower surface of one sidewall of the upper chamber 22 and one side on the upper surface side of the sample base 21 become axes. The inside of the upper chamber 22 is connected to a vacuum pump (not illustrated) and is evacuated by a vacuum pump. According to such an analysis chamber 20, by opening the upper chamber 22, the sample S can be arranged so that the analysis surface of the sample S covers the opening 21a, and after the sample S is arranged, by closing the upper chamber 22, the inside of the upper chamber 21 can be evacuated.

The apparatus casing 50 has a quadrangular cylindrical shape with a quadrangular plate-shaped lower surface, and the peripheral edge of the lower surface side of the sample base 21 is attached to the upper surface of the sidewall of the quadrangular cylindrical shape. The X-ray tube 10 and the detector 30 are arranged inside the apparatus casing 50.

The X-ray tube 10 is, for example, a point focus X-ray tube and has a casing. A target (not illustrated) as an anode and a filament (not illustrated) as a cathode are arranged inside the casing. Thus, by applying a high voltage to the target and applying a low voltage to the filament, thermal electrons emitted from the filament are allowed to collide against the end surface of the target, so that the primary X-rays generated at the end surface of the target are emitted. FIG. 5 is a diagram illustrating energy distribution of the primary X-rays obtained in this manner. In the energy distribution, characteristic X-rays corresponding to a material of the target are superimposed on continuous X-rays.

Then, the X-ray tube 10 is fixedly attached to the lower left side of the opening 21a of the sample base 21 and is configured such that the primary X-rays emitted from the X-ray tube 10 are incident on the opening 21a at an incident angle θ. Therefore, the analysis surface of the sample S is brought into contact with the opening 21a to cover the opening 21a, so that the analysis surface of the sample S is irradiated with the primary X-rays at the incident angle θ.

The detector 30 has, for example, a casing on which an introduction window is formed, and a detection element (semiconductor element) for detecting fluorescent X-rays is arranged inside the casing. The detector 30 is fixedly attached to the lower right side of the opening 21a of the sample base 21 and is configured such that fluorescent X-rays generated on the analysis surface of the sample S are incident on the introduction window. Therefore, when the analysis surface of the sample S is irradiated with the primary X-rays, the detector 30 detects the fluorescent X-rays generated on the analysis surface of the sample S. At this time, an output signal from the detector 30 has a stepwise waveform in which each step of the stepwise waveform indicates that the fluorescent X-rays are detected, and the height of each step indicates the wavelength λ, that is, the X-ray energy E. The pulse processor 41 receiving such an output signal converts the output signal into a pulse having a height proportional to the height (X-ray energy E) of each step. Then, when one pulse is converted, the data memory 42 adds the intensity "1" to the X-ray energy position E corresponding to the height of the pulse, and as a result, the spectrum in which the horizontal axis indicates fluorescent X-ray energy E and the vertical axis indicates an element content (intensity) is generated. FIG. 6 is an example of a spectrum generated when a sample S of element Sn is measured.

Since each element generates fluorescent X-rays having characteristic X-ray energy E, the measurer can observe the spectrum as illustrated in FIG. 6, so that the measurer determines which peak of the spectrum is due to fluorescent X-rays of which element and identifies the type of the element contained in the sample S. For example, in FIG. 6, a certain peak is at 28.5 keV, and it is determined that the fluorescent X-ray having an X-ray energy E of 28.5 keV is examined to be a line Kb among the fluorescent X-rays of the element "Sn". In addition, a certain peak is at 25.0 keV, and it is determined that the fluorescent X-rays having an X-ray energy E of 25.0 keV is examined to be a line Ka among the fluorescent X-rays of the element "Sn".

The primary X-rays include continuous X-rays as illustrated in FIG. 5, and the generated spectrum includes diffracted X-rays satisfying Bragg's condition in addition to the fluorescent X-rays emitted from the sample S as illustrated in FIG. 6. For example, in FIG. 6, a peak of 5 keV, a peak of 6 keV, or a peak of 7 keV appears as a peak of the diffracted X-rays. It is known that such diffracted X-rays are likely to appear as broad peaks as compared with the peaks of fluorescent X-rays, and changing in the arrangement direction of the sample S changes peak intensity, X-ray energy position E, or the like. Based on the information, the measurer distinguishes between the peak due to the fluorescent X-rays and the peak due to the diffracted X-rays.

On the other hand, in order to avoid the inclusion of the diffracted X-rays in the spectrum, for example, <1> changing the energy distribution of the primary X-rays to be irradiated on the sample S (refer to, for example, Patent Document 1), <2> changing and measuring the incident angle θ and the takeoff angle with respect to the sample S (refer to, for example, Patent Document 2), and the like are disclosed.

Patent Document 1: JP-A-2001-349851
Patent Document 1: JP-A-5-52775

SUMMARY

However, in the method <1> as described above, it is necessary to add a mechanism for changing the energy distribution of the primary X-rays, and at the same time, the intensity of the primary X-rays is greatly reduced. Therefore, in order to compensate for this, it is necessary to increase the intensity of the primary X-rays emitted from the X-ray tube 10 by several times to several tens of times or more. From these facts, it is inevitable to increase the size and price of the apparatus itself. In the method <2> as described above, since the X-ray energy E of the diffracted X-rays differs depending on the crystal structure of the sample S, in order to change the incident angle θ and the takeoff angle, it is necessary to set the X-ray tube 10, the detector 30, and the like at arbitrary positions, and thus, it is also inevitable to increase the size and cost of the apparatus itself.

In this regard, an object of the present invention is to provide an X-ray fluorescence analysis apparatus identifying fluorescent X-rays and diffracted X-rays in a software and displaying fluorescent X-ray information and diffracted X-ray information on a peak in a spectrum without changing a configuration of the X-ray fluorescence analysis apparatus, and a spectrum display method used for the same.

In order to solve the above-described problems, according to an aspect of the present invention, there is provided an X-ray fluorescence analysis apparatus having an X-ray tube that emits X-rays to a sample and a detector that detects X-rays from the sample and generating and displaying a spectrum indicating a relationship between X-ray energy and an element content based on the X-rays detected by the detector, the X-ray fluorescence analysis apparatus including: an identification information generation unit that generates identification information specifying a peak position due to a diffracted X-ray caused by a crystal structure of the sample; and a display control unit that displays diffracted X-ray information on a peak in the spectrum based on the identification information.

Herein, the "diffracted X-ray information" includes a plane orientation (Miller indices; h, k, l) of a crystal plane and is, for example, "110", "310", or the like. Therefore, the measurer can recognize the possibility that the peak is a peak of Miller index "110" or "310".

As described above, according to the X-ray fluorescence analysis apparatus of the present invention, diffracted X-rays are specified in a software without changing the configuration of the apparatus, and diffracted X-ray information such as "110" or "310" is displayed on the peak in the spectrum, and as a result, erroneous identification on the side of the measurer is prevented, and reliability of an analysis result is improved.

Solutions for Solving Other Problems and Effects

In the above-described invention, the identification information may include information specifying a peak position due to a fluorescent X-ray caused by an element included in the sample, and the display control unit may display the fluorescent X-ray information and the diffracted X-ray information in the spectrum based on the identification information.

Herein, the "fluorescent X-ray information" includes information on the type of element and is, for example, "FeKa", "CuKa", or the like. This allows the measurer to recognize the possibility that the peak is a peak of "FeKa" or "CuKa".

As described above, according to the X-ray fluorescence analysis apparatus of the present invention, the fluorescent X-rays are specified in a software, and together with the diffracted X-ray information such as "110" or "310", the fluorescent X-ray information such as "FeKa" or "CuKa" is displayed on the peak in the spectrum. As a result, the measurer can more accurately identify the fluorescent X-ray and the diffracted X-ray.

In addition, in the above-described invention, the identification information generation unit may specify the peak position due to the diffracted X-ray based on a type of the crystal structure of the sample input by an input device.

Herein, examples of the "type of the crystal structure (crystal system) of the sample" include a "sodium chloride type structure", a "cesium chloride type structure", and a "low alloy steel".

In addition, in the above-described invention, the identification information generation unit may generate the identification information respectively based on a plurality of types of the crystal structures, and the display control unit may display the diffracted X-ray information on the peak in the spectrum based on at least one piece of the identification information selected from a plurality of pieces of the identification information.

As described above, according to the X-ray fluorescence analysis apparatus of the present invention, even if the measurer does not understand the "type of crystal structure of the sample" measured, it is possible to select and display optimum identification information among the plurality of pieces of the identification information.

In addition, according to another aspect of the present invention, there is provided a spectrum display method used for an X-ray fluorescence analysis apparatus having an X-ray tube that emits X-rays to a sample and a detector that detects X-rays from the sample, and generating and displaying a spectrum indicating a relationship between X-ray energy and an element content based on the X-rays detected by the detector, the spectrum display method, including: an identification information generating step of generating identification information specifying a peak position due to a diffracted X-ray caused by a crystal structure of the sample; and a displaying step of displaying diffracted X-ray information on a peak in the spectrum based on the identification information.

DETAILED DESCRIPTION OF THE DRAWING

Hereinafter, embodiments of the present invention will be described with reference to the drawings. In addition, the present invention is not limited to the embodiments described below, but it goes without saying that various embodiments are included within a scope not deviating from the spirit of the present invention.

Figure 1:
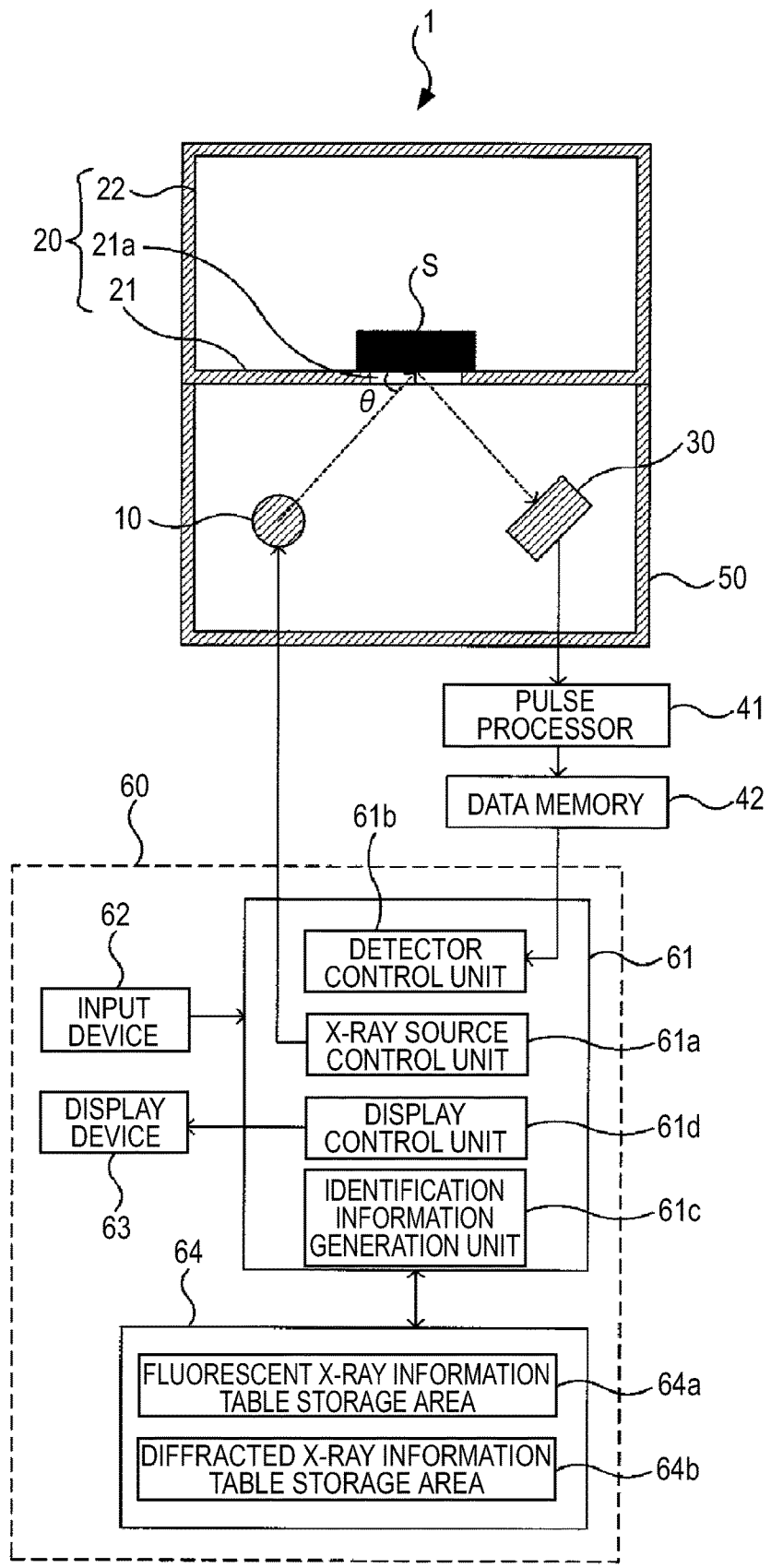
FIG. 1 is a schematic configuration diagram illustrating an example of an energy dispersive X-ray fluorescence analysis apparatus according to an embodiment of the present invention.

FIG. 1 is a schematic configuration diagram illustrating an example of an energy dispersive X-ray fluorescence analysis apparatus according to an embodiment of the present invention. The same components as those of the above-described energy dispersive X-ray fluorescence analysis apparatus 101 in the related art are denoted by the same reference numerals.

An energy dispersive X-ray fluorescence analysis apparatus 1 includes an analysis chamber 20 in which a sample S is arranged, an apparatus casing 50 in which the X-ray tube 10 and a detector 30 are arranged, a pulse processor 41, a data memory 42, and a computer 60 that controls the X-ray tube 10 and the detector 30. That is, the energy dispersive X-ray fluorescence analysis apparatus 1 according to the embodiment of the present invention is different from the energy dispersive X-ray fluorescence analysis apparatus 101 in the related art only in terms of a configuration of the computer.

The computer 60 includes a CPU (control unit) 61, a memory 64, an input device 62, and a display device 63. The memory 64 includes a fluorescent X-ray information table storage area 64a that stores in advance a fluorescent X-ray information table indicating a correspondence relationship between a type of element and X-ray energy E, and a diffracted X-ray information table storage area 64b that stores in advance the following equation (5) expressing a correspondence relationship among a type of a crystal structure, a lattice constant a, a plane orientation (h, k, l) of a crystal plane, and X-ray energy E. The "fluorescent X-ray information table" is similar to that used in the energy dispersive X-ray fluorescence analysis apparatus in the related art, and indicates which element has a peak with which X-ray energy E. If the X-ray energy E is known, the type of element (fluorescent X-ray information) can be understood.

[Mathematical Formula 1]

$$\frac{12.4\sqrt{h^2 + k^2 + l^2}}{2a\sin\theta} = E \tag{5}$$

In addition, h, k, and l in the above equation (5) are plane orientations of the crystal plane of the sample S portion irradiated with primary X-rays. In addition, a is the lattice constant, and $\theta$ is the incident angle of the primary X-ray.

Herein, the equation (5) for specifying the peak position (X-ray energy position E) due to the diffracted X-ray will be described. First, in a case where the sample S is irradiated with the primary X-ray having the wavelength $\lambda$ at the incident angle $\theta$, diffracted X-rays are generated when the plane spacing d of the sample S satisfies the Bragg's condition expressed by the following equation (1).

$$2d \times \sin\theta = n\lambda \tag{1}$$

Herein, n is an integer.

In addition, in the relationship between the wavelength $\lambda$ of the primary X-ray and the X-ray energy E, the following equation (2) is established, and when equation (2) is inserted into equation (1), the following equation (3) is obtained.

$$E = 12.4/\lambda \tag{2}$$

$$12.4/(2d \times \sin\theta) = E \tag{3}$$

Figure 5:
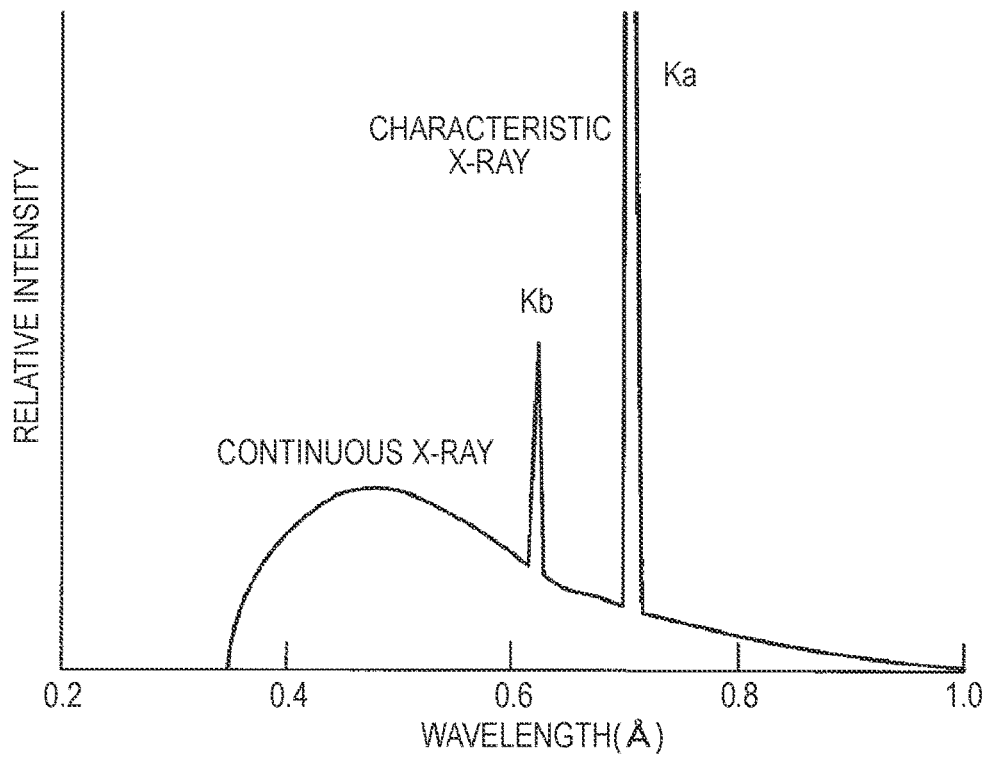
FIG. 5 is a diagram illustrating energy distribution of primary X-rays.
Figure 6:
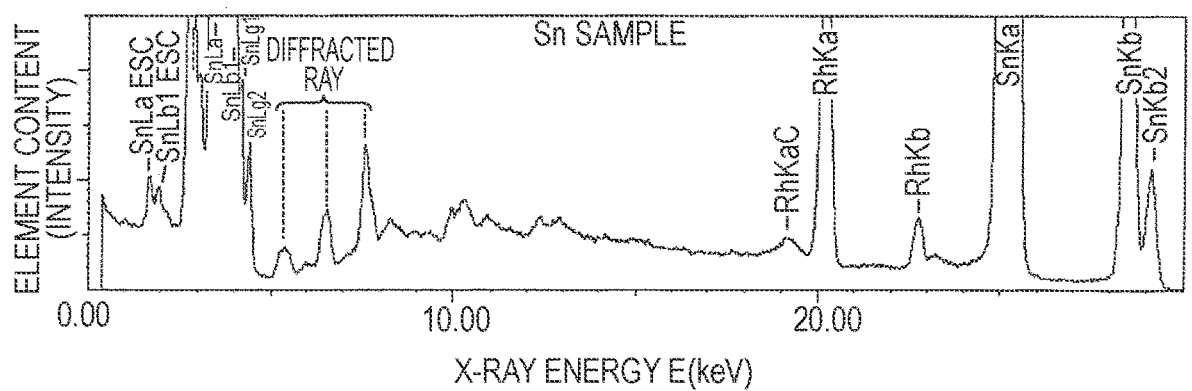
FIG. 6 is an example of a spectrum generated by the energy dispersive X-ray fluorescence analysis apparatus of FIG. 4.

In addition, in the energy dispersive X-ray fluorescence analysis apparatus 1, as illustrated in FIG. 5, the energy distribution of the primary X-rays is such that the characteristic X-rays are superimposed on the continuous X-ray, and thus, even if the incident angle $\theta$ is an arbitrary angle, the diffracted X-rays are generated.

Next, the plane spacing d of the crystal planes is expressed by the following equation (4), and by inserting the equation (4) into the equation (3), the above-mentioned equation (5) is obtained.

[Mathematical Formula 2]

$$d = \frac{a}{\sqrt{h^2 + k^2 + l^2}} \tag{4}$$

By using equation (5), in a case where the incident angle $\theta$ (for example, 45°) of the primary X-ray is fixed, if the plane orientation (h, k, l) of the crystal plane and the lattice constant a are known, the X-ray energy E of the diffracted X-rays is obtained.

Next, the function to be processed by the CPU 61 will be described in a block form. An X-ray source control unit 61a that emits the primary X-ray from the X-ray tube 10, a detector control unit 61b that acquires the spectrum from the detector 30, an identification information generation unit 61c that generates the identification information, and a display control unit 61d that displays the spectrum are included.

Based on the "fluorescent X-ray information table" stored in the memory 64, the identification information generation unit 61c specifies the type of the element contained in the sample S by the peak position (X-ray energy E). Furthermore, based on the "type of crystal structure of the sample S" input from the input device 62 and the equation (5) stored in the memory 64, the identification information generation unit 61c performs control of specifying the possibility that the peak having the X-ray energy E is a peak due to the diffracted X-rays which is generated by "the plane orientation of the crystal plane (h, k, l)" of the sample S and generating identification information.

Figure 2:
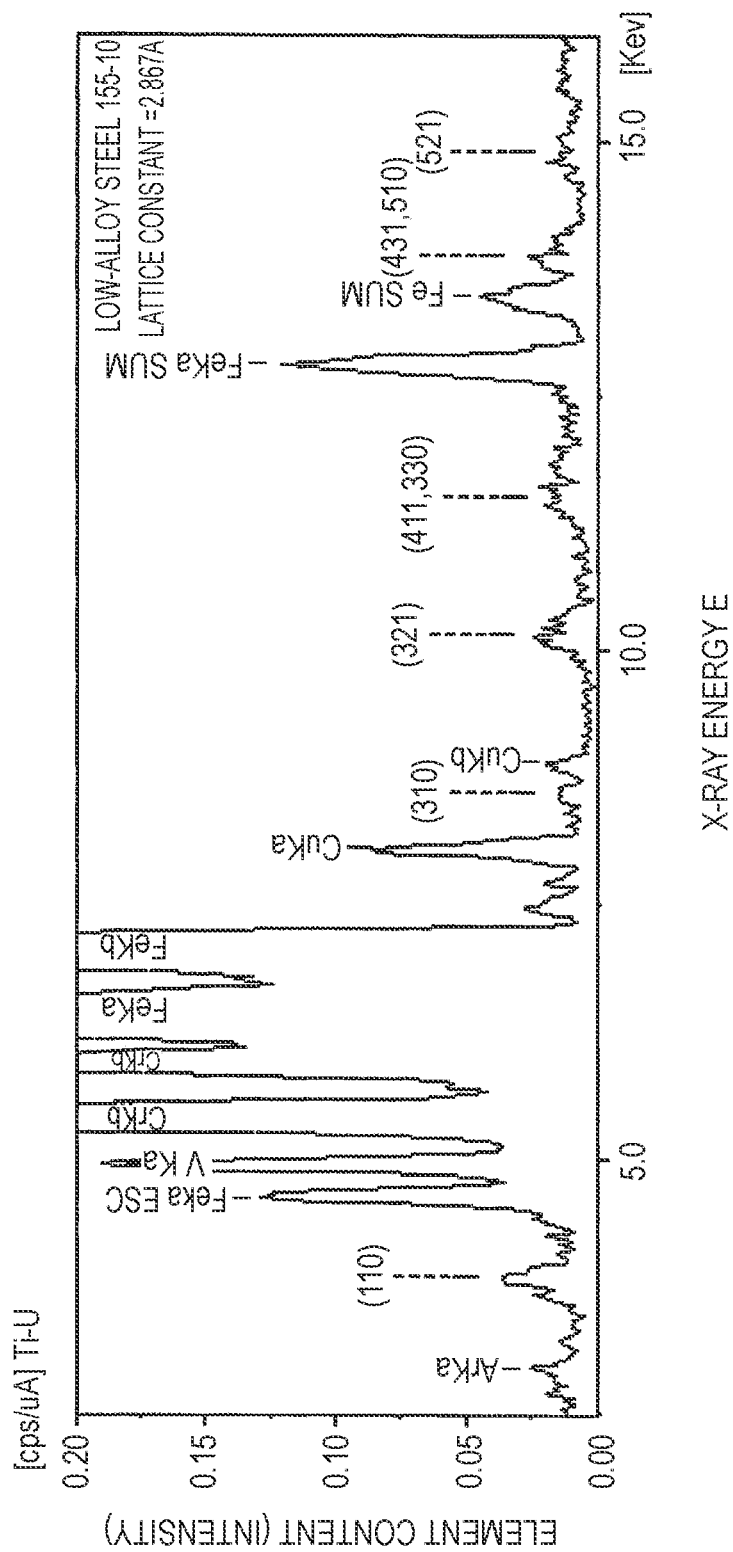
FIG. 2 is an example of a spectrum displayed on the energy dispersive X-ray fluorescence analysis apparatus of FIG. 1.

The display control unit 61d performs control of displaying the fluorescent X-ray information and the diffracted X-ray information in the spectrum on the display device 63 based on the identification information. Herein, FIG. 2 is an example of the displayed spectrum. In the spectrum, the horizontal axis indicates fluorescent X-ray energy E, and the vertical axis indicates element content (intensity). "FeKa" as fluorescent X-ray information is displayed above the peak of 6.4 keV, and thus, by observing "FeKa", the measurer can determine that the peak of 6.4 keV is a line Ka among the fluorescent X-rays of element "Fe". In addition, "321" as diffracted X-ray information is displayed above the peak of 10.0 keV, and thus, by observing "321", the measurer can determine that the peak of 10.0 keV is a diffracted X-ray with the plane orientation "321".

Figure 3:
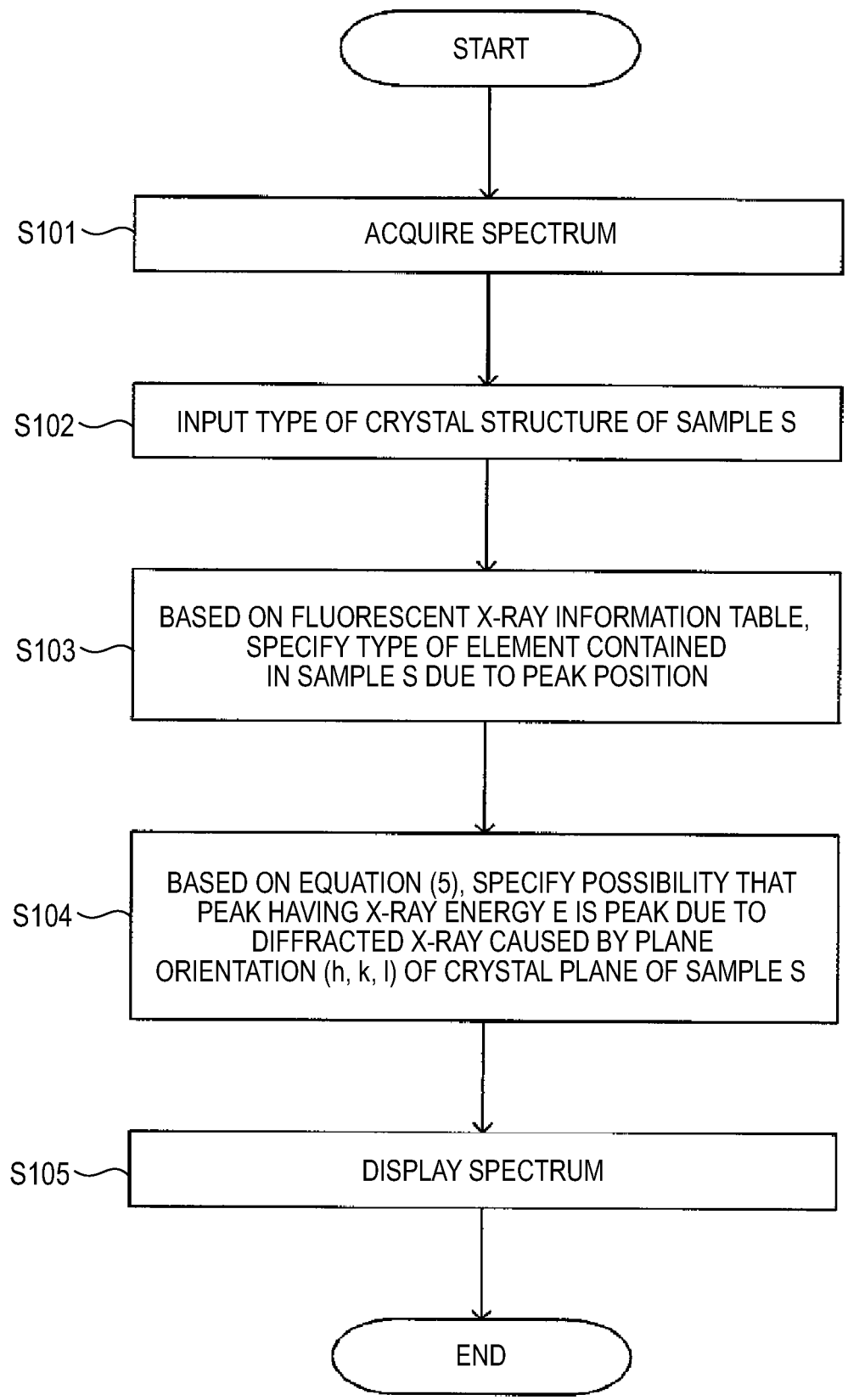
FIG. 3 is a flowchart illustrating a spectrum display method.
Figure 4:
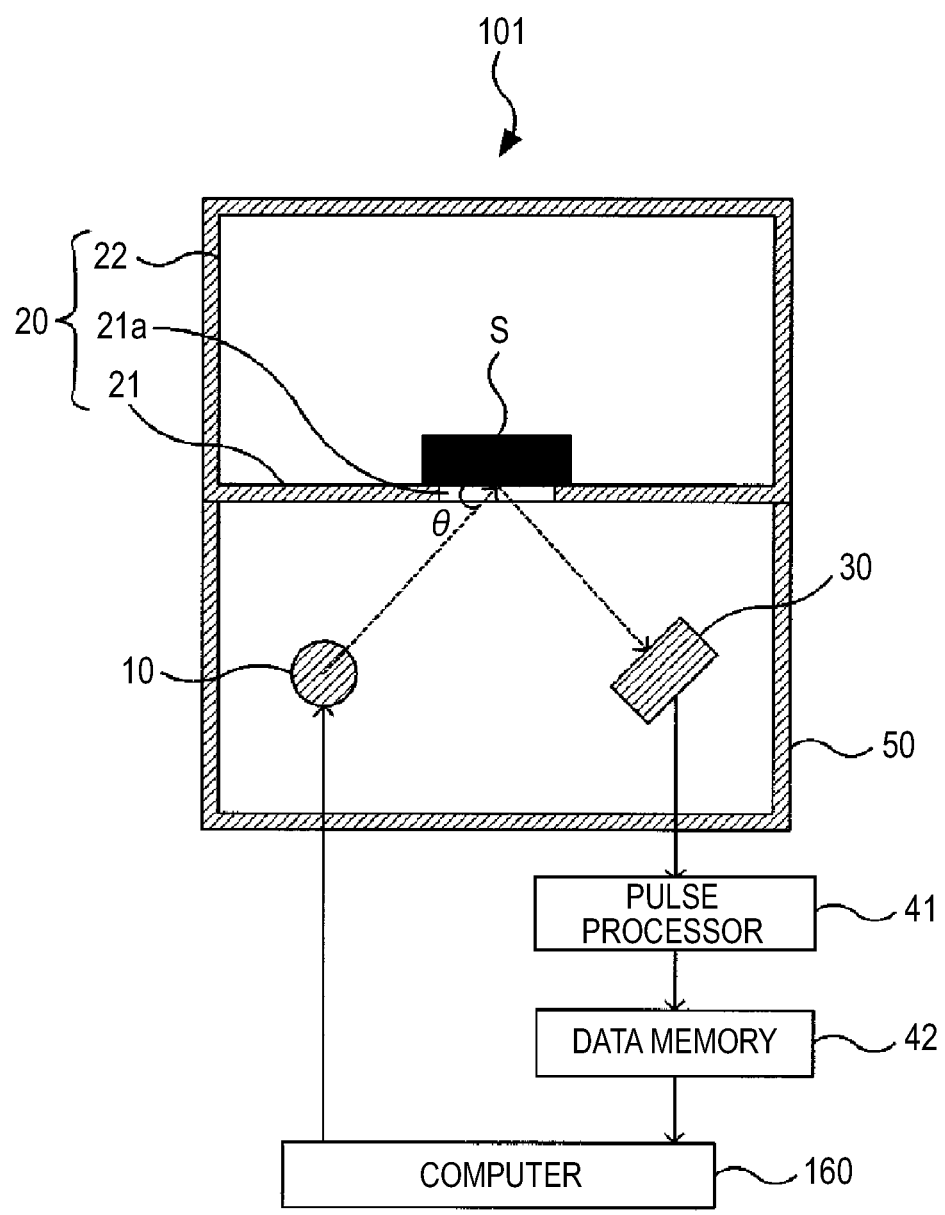
FIG. 4 is a schematic configuration diagram illustrating a general energy dispersive X-ray fluorescence analysis apparatus in the related art.

Herein, a spectrum display method for displaying a spectrum by using the energy dispersive X-ray fluorescence analysis apparatus 1 will be described. FIG. 3 is a flowchart for describing the spectrum display method.

First, in the process of step S101, the detector control unit 61b acquires a spectrum from the detector 30.

Next, in the process of step S102, the measurer inputs "the type of crystal structure of the sample S" by using the input device 62. For example, the measurer inputs "low-alloy steel 155-10" and "lattice constant 2.867 A (angstrom)" as the "type of crystal structure of the sample S".

Next, in the process of step S103, based on the "fluorescent X-ray information table", the identification information generation unit 61c generates identification information specifying the type of the element contained in the sample S by the peak position (X-ray energy E). At this time, since the identification information generation unit 61c cannot determine whether the peak is a peak due to a fluorescent X-ray or a peak due to a diffracted X-ray, misrecognition may be included, but the type of element can also be specified with respect to the peak due to diffracted X-ray as much as possible. For example, it is specified that the peak of 6.4 keV is the line Ka among the fluorescent X-rays of the element "Fe", and it is specified that the peak of 8.0 keV is the line Ka among the fluorescent X-rays of the element "Cu", respectively.

Next, in the process of step S104, by substituting "2.867 A" for "lattice constant a" and "45°" for "incidence angle θ" in the equation (5), the identification information generation unit 61c generates identification information that specifies the possibility that the peak having the X-ray energy E is the peak due to the diffracted X-ray caused by the "plane orientation (h, k, l) of the crystal plane" of the sample S (identification information generating step). At this time, there are also peaks of which the type of the element is specified among the peaks due to diffracted X-rays in the spectrum, but the possibility that the peak is a peak of the "plane orientation of crystal plane (h, k, l)" is specified. For example, it is specified that the peak of 12.0 keV is peaks due to the "plane orientation of crystal plane (411)" and "plane orientation of crystal plane (330)", and the peak of 10.0 keV is a peak due to the "plane orientation of crystal plane (321)", and the like.

Next, in the process of step S105, the display control unit 61d displays the fluorescent X-ray information and the diffracted X-ray information on the spectrum in the display device 63 based on the identification information (displaying step). For example, as illustrated in FIG. 2, "FeKa" as fluorescent X-ray information is displayed above the peak of 6.4 keV, and "321" as diffracted X-ray information is displayed above the peak of 10.0 keV. At this time, both the fluorescent X-ray information and the diffracted X-ray information are displayed with respect to a certain peak, but the measurer distinguishes between the peak due to the fluorescent X-ray and the peak due to the diffracted X-ray based on the displayed fluorescent X-ray information and diffracted X-ray information.

As described above, according to the energy dispersive X-ray fluorescence analysis apparatus 1 according to the present invention, the diffracted X-rays are specified in a software without changing the configuration of the apparatus, and together with the diffracted X-ray information such as "411, 330", or "321", the fluorescent X-ray information such as "FeKa" and "CuKa" is displayed on the peaks in the spectrum, and thus, as a result, erroneous identification on the side of the measurer is prevented, and reliability of an analysis result is improved.

Other Embodiments (1) In the energy dispersive X-ray fluorescence analysis apparatus 1 described above, the configuration using equation (5) is illustrated, but a configuration may be provided such that parameters such as a crystal system, a lattice constant a, and a plane orientation (h, k, l) are stored in the diffracted X-ray information table storage area 64b by using a storage medium storing the parameters. In addition, the parameters may be generated independently or may be parameters using a commercially available database.

(2) In the energy dispersive X-ray fluorescence analysis apparatus 1 described above, the configuration is provided such that the measurer inputs the "type of crystal structure of the sample S" by using the input device 62, but a configuration may be provided such that, without measurer inputting the "type of crystal structure of the sample S", the identification information generation unit first generate identification information based on the types of a plurality of the crystal structures, and the measurer selects one piece of the identification information among the plurality of pieces of the identification information by using the input device. According to such an energy dispersive X-ray fluorescence analysis apparatus, the measurer can select and display optimal identification information among the plurality of pieces of the identification information without understanding the "type of the crystal structure of the sample" measured, so that it is possible to accurately identify the fluorescent X-ray and the diffracted X-ray.

(3) Furthermore, in order to improve the accuracy of the present system, a system obtaining a degree of coincidence with an actual spectrum by a peak fitting method using a resolution parameter based on characteristics of a detector may be used. Particularly, in a case where the fluorescent X-rays and the diffracted X-rays overlap, it is possible to observe the influence by recognizing the presence or absence of display of the diffracted X-rays on a peak having a low degree of coincidence at the time of element identification.

The present invention can be applied to an X-ray fluorescence analysis apparatus or the like that acquires information on elements contained in a sample.

The invention claimed is:

1. An X-ray fluorescence analysis apparatus having an X-ray tube that emits X-rays to a sample and a detector that detects X-rays from the sample and generating and displaying a spectrum indicating a relationship between X-ray energy and an element content based on the X-rays detected by the detector, the X-ray fluorescence analysis apparatus comprising:
    an identification information generation unit that generates identification information specifying a peak position due to a diffracted X-ray caused by a crystal structure of the sample and identification information specifying a peak position due to fluorescent X-rays caused by elements contained in the sample; and
    a display control unit that displays diffracted X-ray information, fluorescent X-ray information, or both diffracted X-ray information and fluorescent X-ray information at each peak in the spectrum based on the identification information.

2. The X-ray fluorescence analysis apparatus according to claim 1,
    wherein the identification information includes information specifying a peak position due to a fluorescent X-ray caused by an element included in the sample, and
    wherein the display control unit displays the fluorescent X-ray information and the diffracted X-ray information in the spectrum based on the identification information.

3. The X-ray fluorescence analysis apparatus according to claim 1, wherein the identification information generation unit specifies the peak position due to the diffracted Xray based on a type of the crystal structure of the sample input by the input device.

4. The X-ray fluorescence analysis apparatus according to claim 1,
- wherein the identification information generation unit generates the identification information respectively based on a plurality of types of the crystal structures, and
- wherein the display control unit displays the diffracted X-ray information on the peak in the spectrum based on at least one piece of the identification information selected from a plurality of pieces of the identification information.

5. A spectrum display method used for an X-ray fluorescence analysis apparatus having an X-ray tube that emits X-rays to a sample and a detector that detects X-rays from the sample and generating and displaying a spectrum indicating a relationship between X-ray energy and an element content based on the X-rays detected by the detector, the spectrum display method comprising:
- an identification information generating step of generating identification information specifying a peak position due to a diffracted X-ray caused by a crystal structure of the sample and identification information specifying a peak position due to fluorescent X-rays caused by elements contained in the sample; and
- a displaying step of displaying diffracted X-ray information, fluorescent X-ray information, or both diffracted X-ray information and fluorescent X-ray information at each peak in the spectrum based on the identification information.

* * * * *